United States Patent [19]

Eisenbeis

[11] Patent Number: 5,124,606
[45] Date of Patent: Jun. 23, 1992

[54] DUAL ROTOR WITH CONTINUOUS/POSITIONING REVERSE CONTROLS

[75] Inventor: Gottfried Eisenbeis, Kaiserslautern, Fed. Rep. of Germany

[73] Assignee: Pfaff Industriemaschinen, Kaiserslautern, Fed. Rep. of Germany

[21] Appl. No.: 499,266

[22] PCT Filed: Nov. 24, 1988

[86] PCT No.: PCT/EP88/01066
§ 371 Date: May 31, 1990
§ 102(e) Date: May 31, 1990

[87] PCT Pub. No.: WO89/05539
PCT Pub. Date: Jun. 15, 1989

[30] Foreign Application Priority Data

Dec. 1, 1987 [DE] Fed. Rep. of Germany ....... 3740697

[51] Int. Cl.[5] .................. H02K 16/02; D05B 69/18; H02P 3/24
[52] U.S. Cl. ................................... 310/114; 112/277; 310/152; 318/258
[58] Field of Search ............... 310/112, 114, 126, 152, 310/156; 318/590, 605, 640, 654, 258, 269, 107, 255, 258, 267; 112/271, 275, 277

[56] References Cited

U.S. PATENT DOCUMENTS

| | | | |
|---|---|---|---|
| 3,521,097 | 7/1970 | Trinter | 310/114 |
| 3,749,949 | 7/1973 | Müller | 310/114 |
| 4,367,435 | 1/1983 | Bailey et al. | 318/258 |
| 4,626,719 | 12/1986 | Foster | 310/114 |
| 4,920,292 | 4/1990 | Albrecht et al. | 310/114 |

FOREIGN PATENT DOCUMENTS

| | | | |
|---|---|---|---|
| 7809452 | 10/1978 | France | |
| 738159 | 10/1955 | United Kingdom | 310/112 |

*Primary Examiner*—Steven L. Stephan
*Assistant Examiner*—D. L. Rebsch
*Attorney, Agent, or Firm*—McGlew & Tuttle

[57] ABSTRACT

A driving motor, for continuous and positioning type operation, includes two different types of rotors, a main rotor and an auxiliary rotor, corresponding to the type of operation required. Both rotors are arranged within the field of a common stator and are controlled by this common stator. The common stator is controlled by a control device in accordance with the function of the rotor to be driven. The driving motor can particularly be used to drive sewing machines.

11 Claims, 3 Drawing Sheets

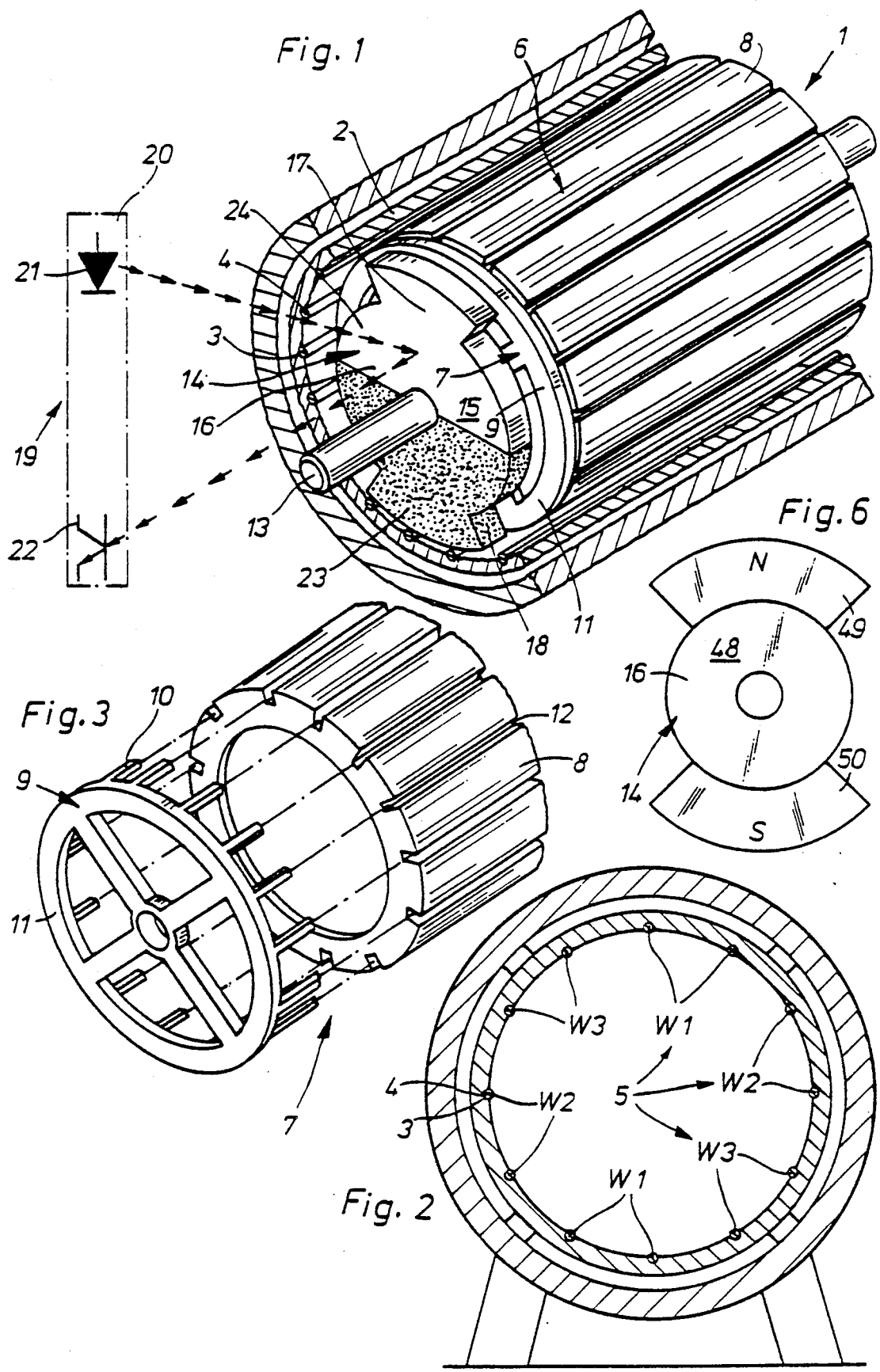

DUAL ROTOR WITH CONTINUOUS/POSITIONING REVERSE CONTROLS

FIELD OF THE INVENTION

The present invention pertains to a drive motor with a stator winding consisting of multiple phase windings, which phase windings can be switched over from continuous operation to positioning operation, and in particular to a main rotor intended for the continuous operation and an auxiliary rotor intended for the positioning operation, the auxiliary rotor being mounted together with the main rotor, on the motor shaft and arranged in the stator field.

BACKGROUND OF THE INVENTION

A driving motor with a stator winding that can be switched over from a single-phase or multi-phase network to a dc network, in whose stator field a squirrel-cage rotor and, together with it, a magnetic rotor mounted on the motor shaft are arranged, is described in French Preliminary Published Patent Application No. 23,86,184. The number of poles and the pole pitch of the magnetic rotor, designed with diametral magnetization direction, correspond to the stator winding poles that can be excited with direct current. The poles of the magnetic rotor are oriented toward the opposite poles of the stator winding when direct current flows through these poles.

The stator winding of the driving motor can be switched over from single-phase or multi-phase network to a direct-current network for different modes of operation, but the manner in which this is done is not specified.

Even though designing the driving motor with a magnetic rotor in which the number of poles and the pole pitch correspond to the stator winding makes it possible, for example, for a stator winding with three phase windings, which is common in asynchronous motors, to decelerate the magnetic rotor in dc operation and to hold it by the stator poles, in whose action zone the rotor poles come to a stop, it is impossible to stop the auxiliary rotor in a predetermined position with the means known from this preliminary published patent application in the case of such a stator winding.

A driving motor, whose stator has a winding consisting of two or more phase windings, is known from West German Offenlegungsschrift No. DE-OS 32,29,351. A plurality of rotors are fastened on the motor shaft one behind the other in the axial direction in the stator field, and at least one of these [rotors] is designed as a squirrel-cage rotor and at least one is designed as a synchronous rotor excited by permanent magnets. In the synchronous rotor, a soft iron yoke, which carries two half-ring-shaped permanent magnets, is arranged on a hub made of nonmagnetizable material.

Even though a similar design of the stator as well as the different rotors are described in this Offenlegungsschrift, the manner in which the stator winding is operated to drive the rotor is not mentioned at all.

West German Offenleguingsschrift No. DE-OS 19,47,721 describes a three-phase squirrel-cage motor, on whose shaft an armature disk rotor is arranged nonrotatably. The rotor is supplied with direct current via carbon brushes and is subject to an axially directed magnetic field of a second stator. Positioning is performed by the armature disk rotor when the speed of the motor shaft drops below an adjustable speed limit during deceleration.

It is disadvantageous in such drive motors that different stators are needed for the different modes, such as continuous operation or positioning operation, which makes the drive motor more complicated and expensive. The additional stator also increases the weight.

The construction and the mode of operation of a self-commutated converter is described in the book *Elektrotechnik fur Maschinenbauer* by H. Linse (Teubner-Verlag, Stuttgart, 6th revised edition, pp. 303 and 304). One of these self-commutated converters is represented according to FIG. 303.1 of this publication as the control unit of an asynchronous three-phase squirrel-cage motor. A dc intermediate circuit is supplied with constant voltage via a rectifier that is connected to a three-phase power net. A three-phase pulse invertor is connected to this intermediate circuit.

The required alternating current of any desired frequency can be produced by the pulse invertor, according to the subharmonic method for example. The direct voltage received is sent to the stator winding in the form of square pulses of different polarizations and different pulse times, so that a sinusoidal oscillation of the desired frequency and amplitude is obtained as a subharmonic.

Using such a converter, it is possible to vary the speed of a three-phase squirrel-cage motor within a relatively broad range.

A stepper motor whose stator has poles arranged at equal angular offsets, each of which is wound with a coil, is described in West German Preliminary Published Patent Application No. DE-OS 25,42,395. The coils are connected so that two adjacent coils always act on a rotor whose magnetic axis is defined by a permanent magnet or a rotor body of variable magnetic resistance. As a result, the rotor is positioned in a resting position that is predetermined by the resultant effect of the two coil fields. If further coils are energized one after another in the predetermined nominal direction of rotation of the rotor, the rotor is always turned further through an angle predetermined by the distance between the coils.

Even though such stepper motors are excellent for positioning, acceleration and deceleration processes between two resting positions these stopper motors have a disadvantageous effect for continuous operation. In addition, stepper motors are relatively sophisticated and expensive because of their complicated design and are uneconomical beyond a certain power limit.

SUMMARY AND OBJECTS OF THE INVENTION

It is a primary object of the present invention to design and energize a drive motor so that it has a simple design and low weight, it is suitable for a plurality of modes, its speed can be regulated down to zero, or a stop, and its motor shaft can be positioned in a preselectable position.

It is a further object of the invention to supply phase windings of a stator winding with current so that movement of a main rotor is controllable during continuous operation and an auxiliary rotor can be driven during the positioning operation. The auxiliary rotor is designed so that it can be positioned in a predeterminable stopping position.

According to the invention, the driving motor is provided with a stator winding consisting of multiple phase windings. These phase windings being switchable over from a continuous operation to a positioning operation. The main rotor is intended for the continuous operation function and an auxiliary rotor is intended for the positioning operation. The two rotors, the main rotor and the auxiliary rotor are mounted together on a motor shaft arranged in the stator field. The stator winding, including the plurality of phase windings, is provided such that the windings are connected to a control device suitable for changing the speed and direction of rotation during the continuous operation, as well as for positioning the drive motor by means of the auxiliary rotor. The auxiliary rotor is provided with a reluc-ring segments which are separated from the coils of the phase windings by respective air gaps and the number and angular offset of the ring segments correspond to the phase windings to which direct current is applied during the positioning operation.

The phase windings can be connected to the power source in a sequence that can be predetermined by the control device. The control device can then change the speed and the direction of rotation during the continuous operation as well as for positioning the rotor with direct current by means of the auxiliary rotor. For the different modes of operation of the stator winding, only the setting of the control device is changed, so that the phase windings can be energized in a sequence associated with the new setting. As a result, the stator winding is suitable for driving different types of rotors.

A rotating field, which continuously drives the main rotor, and whose speed and direction are determined by the sequence of energization of the phase windings arranged adjacent to each other, is needed for continuous operation.

The auxiliary rotor is designed with ring segments which are separated from the coils of the phase windings by respective air gaps and whose number and angular offset correspond to the phase windings to which the direct current is applied during positioning. Switching off at least one phase winding over a rather long period of time causes the auxiliary rotor to be oriented to the phase winding that is connected if only one phase winding is connected, and between the two phase windings if two phase windings are connected, and then to be held in this position. Since only one of the phase windings or one pair of phase windings, whose combination differs from those of other phase winding pairs, is connected at any one time and the auxiliary rotor has at most two ring segments, there will be a plurality of predeterminable stopping positions, in which the auxiliary rotor can be positioned, in the case of a stator winding containing more than two phase windings.

Switching over between the two modes of operation—continuous operation and positioning operation—is controlled such that the stator winding is switched to continuous operation until a predeterminable minimum connection frequency of the phase windings spring connected by the control device to the power supply. The drive motor is then switched to positioning operation when the actual connection frequency drops below this predetermined minimum connection frequency. Switching to positioning operation is advantageously performed when the frequency of connections of the phase windings drops toward zero, i.e., shortly before the rotating field and consequently the rotor stop, so that the residual rotation energy of the rotors is sufficient to move it further, without driving, to the stopping position, in which it will be held under the effect of the connected phase windings.

An arrangement according to the invention involves transistors which are provided and are switched over to current conduction by the control device for the duration of a signal to supply power for the phase windings. The transistors are arranged between the control device and the phase windings of the stator winding. This specifies an advantageous circuit by which the phase windings of the stator winding can be energized in the actually needed sequence according to a simple technical solution.

Different auxiliary rotors can be driven by the stator winding. Thus, the auxiliary rotor is designed as a reluctance rotor or it is designed as a permanent-magnet rotor. Such auxiliary rotors, which have simple design, permit accurate positioning. The oriented position of the auxiliary rotor is determined by the shape of the auxiliary rotor and the shape of the auxiliary rotor is determined by the arrangement of the magnets on the rotor body.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a partial cutaway view of a drive motor according to the invention;

FIG. 2 is a sectional view of the stator according to FIG. 1;

FIG. 3 is a perspective view of the rotor according to FIG. 1;

FIG. 6 is another embodiment of the auxiliary rotor.

DETAILED DESCRIPTION OF THE PREFERRED EMBODIMENTS

Figure 5:
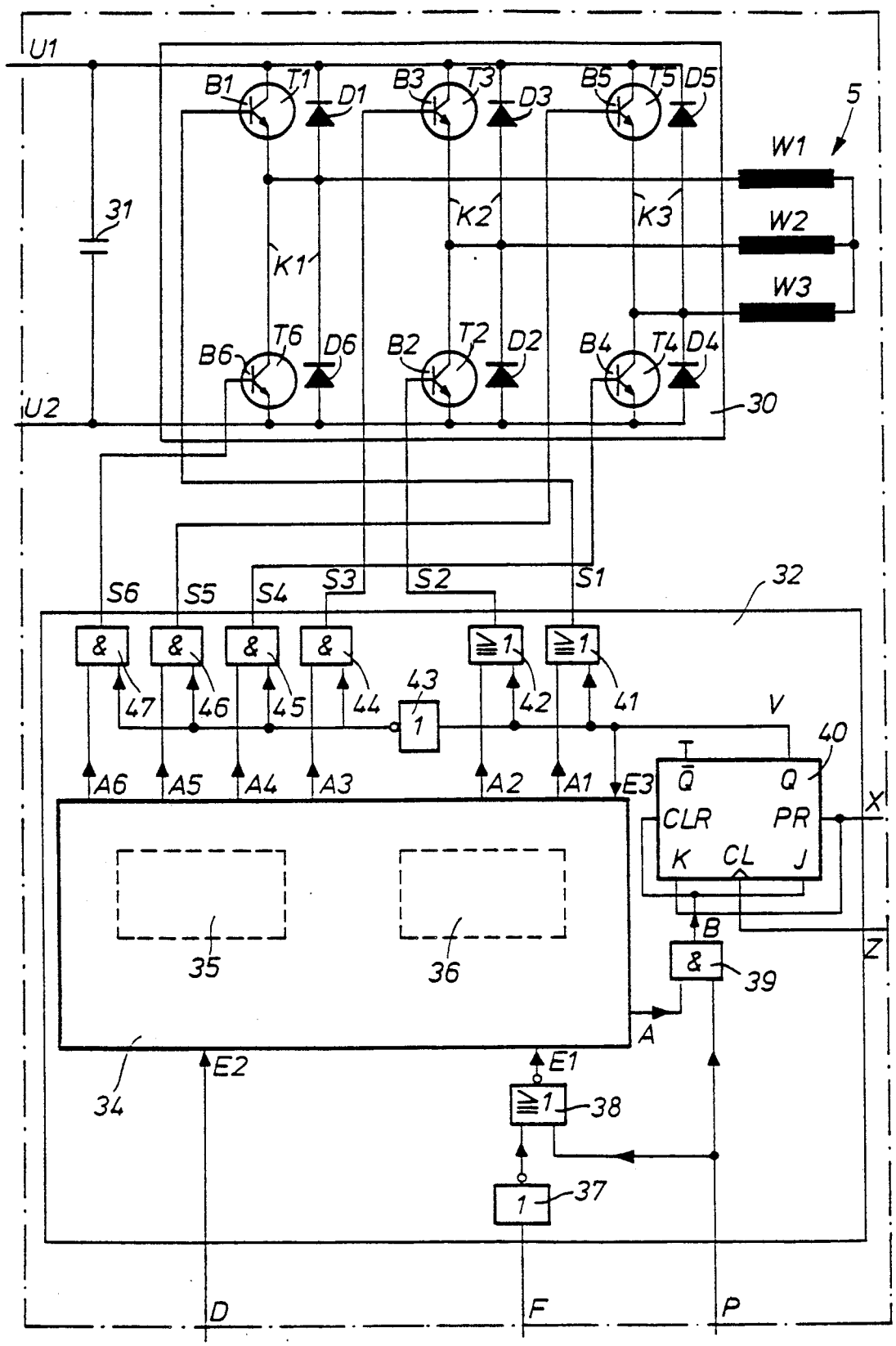
FIG. 5 is a detail of the circuit diagram of FIG. 4 defined by the dash-dotted line.

Referring to the drawings and in particular to FIG. 1, the invention comprises a drive motor 1 in whose housing a stator 2 is accommodated. To suppress eddy currents, the stator 2 consists of a plurality of magnetic lamination stacks, and along its internal diameter it has slots 3 in which coils 4 of phase windings W1, W2, and W3 (FIG. 2) of a stator winding 5 are embedded. The coils 4 of each phase winding W1 through W3 are connected in series.

The stator 2 surrounds a main rotor 6 which is designed as a cage rotor 7 (FIG. 3). The core 8 of the cage rotor 7 consists of magnetic lamination stacks, and the cage 9 is formed by bars 10 connected via rings 11. The bars 10 are arranged in axial slots 12 on the circumference of the core 8 and the rings 11 are arranged on the front sides of the core.

An auxiliary rotor 14, which is also surrounded by the stator 2, is mounted nonrotatably on the shaft 13 of the drive motor 1. This auxiliary rotor is designed as a reluctance rotor 15 which has the shape of a disk 16 with two ring segments 17 and 18 provided on the outer diameter of the disk at a 180° angle relative to each other. The outside diameter of the reluctance rotor 15 is fitted to the outer diameter of the core 8 in the zone of the ring segments 17 and 18. To suppress eddy currents, the reluctance rotor 15 is also composed of magnetic lamination stacks.

For unambiguous positioning, the reluctance rotor 15 is scanned by an optoelectronic monitoring device 19, which comprises a photocell 20 with a light emitter 21 and a light receiver 22. Therefore, the reluctance rotor 15 is frosted on one half 23 up to the midline between the two ring segments 17 and 18, whereas it has a reflecting surface on the other half 24.

Figure 4:
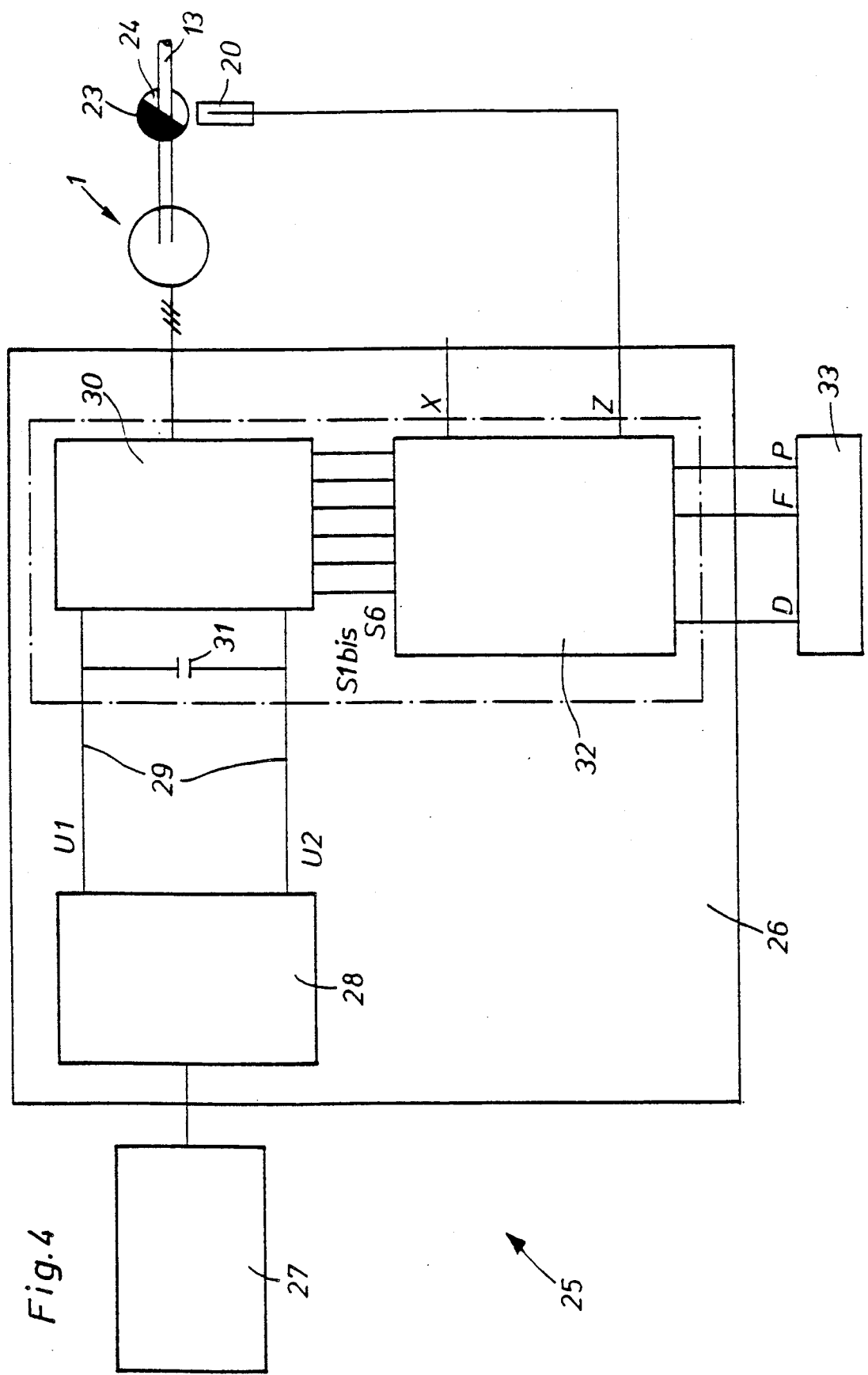
FIG. 4 is a simplified circuit diagram of the drive motor according to the invention.

FIG. 4 shows, in a simplified circuit diagram, the components of a circuit 25 necessary for the functioning of the drive motor 1, wherein the drive motor 1 is connected to a three-phase power source 27 via a converter 26 serving to regulate the speed of the cage rotor 7.

The converter 26 is provided with a rectifier 28 which is connected to an invertor 30 via lines U1 and U2 of a dc intermediate circuit 29. A capacitor 31 for smoothing the dc voltage is connected to the intermediate circuit 29 in parallel with the rectifier 28 and the invertor 30. The invertor 30 is connected via control lines S1 through S6 to a control device 32 which in turn is connected to a control panel 33 via lines D, F, and P.

The part of the control circuit 25 defined by dash-dotted lines is shown on a larger scale in FIG. 5. Transistors T1 through T6 used as amplifiers and recovery diodes D1 through D6 are connected to the lines U1 and U2 leading into the invertor 30. The transistors T1 through T6 are paired and the transistors in each part are connected in series. The recovery diodes D1 through D6 are also similarly paired in series. These transistor and diode pairs are connected in parallel and circuits K1 through K3 contain one transistor and diode pair in parallel. The individual circuits K1 through K3 are connected, in parallel to one another, to the lines U1 and U2.

The bases B1 through B6 of the transistors T1 through T6 are connected to the control device 32 via the control lines S1 through S6. Spikes generated in the stator winding 5 by switching processes of the transistors T1 through T6 are prevented by the recovery diodes D1 through D6.

The control device 32 is provided with a microprocessor 34 having a RAM memory 35 and a ROM 36. The microprocessor 34 receives signals at one input E1 from the line F via a negation element 37 and a NOR element 38 and signals at an input E2 from the line D.

A branch of the line P is attached as a second connection. This branch is connected to the NOR element 38 and connected to an AND element 39 together with an output A of the microprocessor 34. The output line B of the AND element 39 is connected to a setting input CLR and an input J of a J-K flipflop memory 40. The second setting input PR and second input K are connected to a line X sending a resetting signal. Line Z of the photocell 20 is connected to the timing input CL of the memory 40, and output Q is connected to line V.

While one branch of the line V is connected to an input E3 of the microprocessor 34, its main strand is connected, together with outputs A1 and A2 of the microprocessor 34, to OR elements 41 and 42 and, via an intercalated negation element 43, with the outputs A3 through A6 of the microprocessor 34, to AND elements 44 through 47. The outputs of the OR elements 41 and 42, and of the AND elements 44 through 47 are connected to the control lines S1 through S6.

The drive motor 1 operates as follows:

For rotation, a binary signal having potential H, hereinafter called signal H, is sent from the control panel 33 to the line F. After passing through the negation element 37, the two inputs or the NOR element 38 have potential L, hereinafter called signals L, and the NOR element 38 causes a signal H at the input E1 of the microprocessor 34. The microprocessor 34 is thus ready to receive a signal present at its input E2, which corresponds to a speed set on the control panel 33. This signal causes the microprocessor 34 to poll a control program associated with the signal from its RAM 35. The control program defines the intervals of time at which signals H are sent to three different, consecutively energized binary groups of outputs A1 through A6. The composition of the individual binary groups, as well as their sequence of one after another, is also determined by the control program.

Since a signal L is present at the output line V of the J-K flipflop memory 40 and into the negation element 43 and a signal H is present after negation element 43, signals H are sent to the OR elements 41 and 42, as well as to the AND elements 44 through 47 in the same sequence as to the outputs A1 through A6. These signals are transmitted via the control lines S1 through S6 to the bases B1 through B6 of the transistors.

As soon as, for example, such signals are present on the bases B1 and B2, the otherwise blocked transistors T1 and T2 are briefly switched over to conduction, so that the current flows from the line U1 forming the positive pole via the transistor T1, phase windings W1 and W2, and transistor T2 to the line U2 forming the negative pole. Subsequently, the bases B3 and B4 and subsequently the bases B5 and B6 are energized. In contrast, the transistors T1 through T6 and consequently the phase windings W1 through W3 are to be energized in the opposite sequence for another direction of rotation of the cage rotor 7.

For positioning operation, a signal H is sent to line P, so that a signal L is present at the input E1 of the microprocessor 34. The microprocessor 34 stops the polling of the control program that determines the rotation mode from the RAM memory 35 and starts a program stored in the ROM memory 36, by which the sequence of the signals sent to the outputs A1 through A6 is reduced to a lack of signal corresponding to a fixed frequency ramp predetermined by the program.

When the set of signals leaving the outputs A1 through A6 drops below a limiting frequency value stored in the microprocessor 34, the microprocessor 34 sends a signal H from its output A to the AND element 39. Because a signal H is already present at the second input of the AND element 39, this signal is carried forward to the inputs CLR and J of the memory 40.

The memory 40 has a dynamic input CL, so that the output signal of the AND element 39 is received and sent from the output Q to the line V only when the signal present at the input CL changes from L to H. This change occurs when the reflecting half 24 of the reluctance rotor 15 swivels into the monitoring zone of the photocell 29.

The memory 40 can be reset by a signal H, which is sent to the inputs PR and K via line X in an appropriate manner.

Energization of the memory 40 via line Z is necessary in order] to stop the reluctance rotor 15 in a clearly defined position, hereinafter called the resting position. The presence of two resting positions in a reluctance rotor 15 can be explained as follows:

The magnetic field generated by the stator winding 5 propagates via the air gaps between the coils 4 of the stator winding 5 and the reluctance rotor 15 and finally via the rotor body. Since the magnetic flux density reaches a maximum at the point of the smallest air gap, the reluctance rotor 15 is always aligned so that the ring segments 17 and 18 are adjacent to the north and south poles, respectively, of the magnetic field generated by the stator 2. Since the reluctance rotor 15 does not generate a magnetic field of its own, two resting positions enclosing an angle of 180° with each other are possible due to the two ring segments 17 and 18 of the reluctance rotor 15.

The change of the signal at the output Q of the memory 40 from L to H is reported back to the microprocessor 34 via the input E3, after which the microprocessor stops sending signals to the outputs A3 through A6 and sends continuous signals H to the outputs A1 and A2. These are sent from the OR elements 41 and 42 to the bases B1 and B2. The transistors T1 and T2 are thus permanently switched to conduction. Consequently, current flows only through the phase windings W1 and W2, so that these generate the magnetic fields for positioning the reluctance rotor 15.

The auxiliary rotor 14 may be designed as a permanent-magnet rotor 48 as shown in FIG. 6, whose shape corresponds to that of the reluctance rotor 15, but the ring segment parts 17 and 18 are replaced with permanent magnets 49 and 50. These are also adapted to the outside diameter of the core 8 of the cage rotor 7.

If only the transistors T1 and T2 are switched to conduction during positioning operation, the permanent-magnet rotor 48 will be aligned corresponding to the resultant magnetic field generated by the windings W1 and W2. The opposite poles of the magnetic field of the stator 2 and of the permanent magnets 49 and 50 always oppose each other in the position established.

Since the permanent-magnet rotor 48 can be located in an unambiguously defined position, it is possible to eliminate the monitoring device 19 and the memory 40. The line V is now connected to the output of the AND element 39.

While specific embodiments of the invention have been shown and described in detail to illustrate the application of the principles of the invention, it will be understood that the invention may be embodied otherwise without departing from such principles.

I claim:
1. A drive motor comprising:
    a motor shaft;
    a main rotor mounted on said motor shaft;
    an auxiliary rotor mounted on said motor shaft, said auxiliary rotor having a ring segment;
    a single common stator surrounding said main rotor and said auxiliary rotor, said single common stator having a plurality of phase windings; and
    control means connected to said plurality of phase windings for controlling rotational direction by energizing individual phase windings of said plurality of phase windings in a specific sequence, said control means controlling rotational speed by controlling frequency of said energizing of said individual phase windings, and said control means controlling stopping position of said main rotor shaft by energizing one of said plurality of phase windings interacting with said ring segment causing said main rotor to stop in a specific position.

2. A drive motor in accordance with claim 1, wherein: said main rotor is an induction type rotor.

3. A drive motor in accordance with claim 1, further comprising:
    a control panel connected to said control means for setting said rotational direction, said rotational speed and said stopping position.

4. A drive motor in accordance with claim 3, wherein:
    said control means has amplifiers connected to said phase windings, said amplifiers varying said power supplied to said phase windings in response to control signals.

5. A drive motor in accordance with claim 4, wherein:
    said control means has microprocessor means for reading data from said control panel and generating said control signals.

6. A drive motor in accordance with claim 5, further comprising:
    a memory means connected to said microprocessor means for supplying said microprocessor means with a control program.

7. A driving motor with a common stator winding arrangement for switching the driving motor over from continuous operation to positioning operation, comprising: a main rotor provided for continuous operation; an auxiliary rotor intended for positioning operation, said auxiliary rotor being provided with ring segments which are separated from the windings of the stator by air gaps, the number of said ring segments and angular offset of said ring segments corresponding to the phase windings to which direct current is applied during the positioning operation, said auxiliary rotor being mounted together with said main rotor on a motor shaft arranged in a stator field; the common stator winding arrangement including a plurality of phase windings with control means connected to said plurality of phase windings for changing the speed and direction of rotation of said main rotor during continuous operation, as well as for positioning the driving motor by said auxiliary rotor.

8. A driving motor according to claim 7, wherein: said control means switches said stator winding to continuous operation until a predeterminable minimum value of phase windings connected to said control means per unit of time is reached, and to positioning operation when the actual value drops below said predeterminable minimum value.

9. A driving motor according to claim 7, wherein: said control means includes a control device and transistors which can be switched over to current conduction by said control device for the duration of a signal, supplied by said control device, to supply power for the phase windings, said transistors being positioned between said control device and said phase windings of said stator.

10. A driving motor according to claim 7, wherein said auxiliary rotor is designed as a reluctance rotor.

11. A driving motor according to claim 7, wherein said auxiliary rotor is designed as a permanent-magnet rotor.

* * * * *